US008088511B2

(12) United States Patent
Hermann et al.

(10) Patent No.: US 8,088,511 B2
(45) Date of Patent: Jan. 3, 2012

(54) CELL CAP ASSEMBLY WITH RECESSED TERMINAL AND ENLARGED INSULATING GASKET

(75) Inventors: Weston Arthur Hermann, Palo Alto, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 381 days.

(21) Appl. No.: 12/459,721

(22) Filed: Jul. 7, 2009

(65) Prior Publication Data
US 2010/0136421 A1    Jun. 3, 2010

Related U.S. Application Data

(63) Continuation-in-part of application No. 12/456,150, filed on Jun. 12, 2009, now Pat. No. 8,057,928.

(51) Int. Cl.
*H01M 2/30* (2006.01)
*H01M 2/02* (2006.01)

(52) U.S. Cl. .................................... 429/178; 429/181
(58) Field of Classification Search ............... 429/7, 61, 429/178, 181
See application file for complete search history.

(56) References Cited

U.S. PATENT DOCUMENTS

| 4,053,687 | A  | * | 10/1977 | Coibion et al. | 429/94 |
| 7,927,739 | B2 | * | 4/2011  | Issaev et al.  | 429/199 |
| 2010/0215997 | A1 | * | 8/2010 | Byun et al. | 429/61 |

* cited by examiner

*Primary Examiner* — John S Maples
(74) *Attorney, Agent, or Firm* — Patent Law Office of David G. Beck

(57) ABSTRACT

A simplified cell design is provided for a battery utilizing the 18650 form-factor in which the CID and PTC elements are eliminated, thereby reducing manufacturing cost and battery weight. To reduce the risk of shorting between the battery case and the battery terminal, the battery terminal is recessed relative to the top of the cell case and the insulating gasket positioned between the cell case and the cap assembly is designed to cover a large portion of the outer surface of the terminal element.

15 Claims, 7 Drawing Sheets

CELL CAP ASSEMBLY WITH RECESSED TERMINAL AND ENLARGED INSULATING GASKET

CROSS-REFERENCES TO RELATED APPLICATIONS

This application is a continuation-in-part of U.S. patent application Ser. No. 12/456,150, filed Jun. 12, 2009 now U.S. Pat. No. 8,057,928, the disclosure of which is incorporated herein by reference for any and all purposes.

FIELD OF THE INVENTION

The present invention relates generally to battery cells and, more particularly, to a simplified cell design.

BACKGROUND OF THE INVENTION

Batteries have been used for decades to supply power to a variety of different electrical and electro-mechanical devices. Early batteries, referred to as disposable batteries, were simply used until depleted and then discarded and replaced with one or more new batteries. A newer type of battery, referred to as a rechargeable or secondary battery, is capable of being recharged and then reused, therefore offering economic, environmental and ease-of-use benefits compared to a disposable battery.

For many applications in which multiple batteries are required, a battery pack is used in which the batteries are housed within a single or multi-piece housing. Although initially battery packs were relatively small, for example housing just a few batteries, many battery packs used today, such as those used in hybrid and electric vehicles, house tens to thousands of cells. As such, battery weight is of critical importance, as are manufacturing simplicity and cost. Additionally, due to the large number of cells required for such a sizeable battery pack, it is important that the batteries can be safely and easily transported, stored and assembled with minimal risk of battery shorting. Accordingly, what is needed is a simplified cell design that reduces manufacturing cost, weight, and the risk of shorting. The present invention provides such a design.

SUMMARY OF THE INVENTION

The present invention simplifies the design of a battery utilizing the 18650 form-factor, thereby reducing manufacturing cost and battery weight. Additionally, the disclosed design substantially reduces the risk of shorting between the battery case and the battery terminal. In at least one embodiment of the invention, a battery is provided that is comprised of a cylindrical cell case with a closed case bottom and a second end with a central open portion; an electrode assembly contained within the cell case with one electrode of the assembly electrically connected to the cell case; a terminal element mounted within the cell case and electrically connected to the second electrode of the electrode assembly; and an insulating gasket interposed between an inner surface of the cell case and the terminal element. The insulating gasket includes an aperture that defines the battery terminal. The terminal element may be comprised of aluminum. The insulating gasket may be comprised of a first insulating member and a second insulating member, for example an insulating ring-shaped member and an insulating disk-shaped member. The insulating gasket may cover at least 50 percent of the outer surface of the terminal element; alternately at least 75 percent; alternately at least 90 percent; alternately at least 95 percent. The insulating gasket may be comprised of a material selected from the group of materials consisting of synthetic polymers, synthetic fluoropolymers or polyimides. The outer surface and/or the inner surface of the terminal element may be scored to facilitate battery venting when the internal cell pressure increases beyond the intended operating range of the cell.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figure 1:
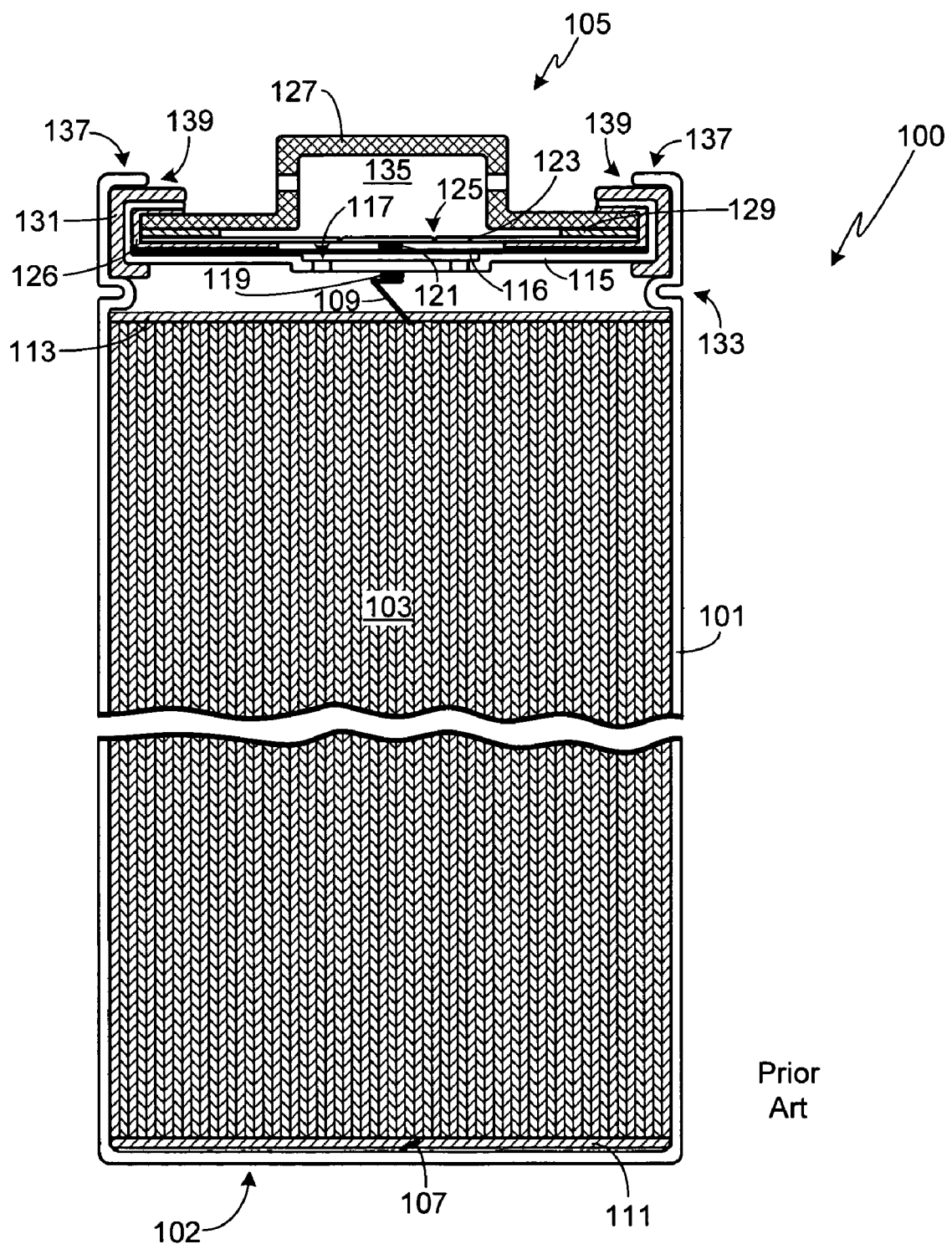
FIG. 1 is a cross-sectional view of a conventional cell and cap assembly commonly used with lithium ion batteries employing the 18650 form-factor.

FIG. 1 is a cross-sectional view of a conventional cell and cap assembly commonly used with lithium ion batteries employing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. For an 18650 cell, case 101 is often referred to as a can as it is comprised of a cylinder and an integrated, i.e., seamless, bottom surface 102. Electrode assembly 103 is comprised of an anode sheet, a cathode sheet and an interposed separator, wound together in a spiral pattern often referred to as a 'jelly-roll'. An anode electrode tab 107 connects the anode electrode of the wound electrode assembly to the negative terminal which, for an 18650 cell, is case 101. A cathode tab 109 connects the cathode electrode of the wound electrode assembly to the positive terminal via cap assembly 105. Typically battery 100 also includes a pair of insulators 111/113 located on either end of electrode assembly 103 to avoid short circuits between assembly 103 and case 101.

In a conventional cell, cap assembly 105 is a relatively complex assembly that includes multiple safety mechanisms. In cell 100, tab 109 is connected to assembly 105 via a current interrupt device (CID). The purpose of the CID is to break the electrical connection between the electrode assembly and the positive terminal if the pressure within the cell exceeds a predetermined level. Typically such a state of over pressure is indicative of cell overcharging or of the cell temperature increasing beyond the intended operating range of the cell, for example due to an extremely high external temperature or due to a failure within the battery or charging system. Although other CID configurations are known, in the illustrated cell the CID is comprised of a lower member 115 and an upper member 116. Members 115 and 116 are electrically connected, for example via crimping along their periphery. Lower member 115 includes multiple openings 117, thus insuring that any pressure changes within case 101 are immediately transmitted to upper CID member 116. The central region of upper CID member 116 is scored (not visible in FIG. 1) so that when the pressure within the cell exceeds the predetermined level, the scored portion of member 116 breaks free, thereby disrupting the continuity between the electrode assembly 103 and the battery terminal.

Under normal pressure conditions, lower CID member 115 is coupled by a weld 119 to electrode tab 109 and upper CID member 116 is coupled by a weld 121 to safety vent 123. In addition to disrupting the electrical connection to the electrode assembly during an over pressure event, the CID in conjunction with safety vent 123 are designed to allow the gas to escape the cell in a somewhat controlled manner. Safety vent 123 may include scoring 125 to promote the vent rupturing in the event of over pressure.

The periphery of CID members 115/116 are electrically isolated from the periphery of safety vent 123 by an insulating gasket 126. As a consequence, the only electrical connection between CID members 115/116 and safety vent 123 is through weld 121.

Safety vent 123 is coupled to battery terminal 127 via a positive temperature coefficient (PTC) current limiting element 129. PTC 129 is designed such that its resistance becomes very high when the current density exceeds a predetermined level, thereby limiting short circuit current flow. Cap assembly 105 further includes a second insulating gasket 131 that insulates the electrically conductive elements of the cap assembly from case 101. Cap assembly 105 is held in place within case 101 using crimped region 133.

Elements 115, 116 and 123 must be fabricated from a material that does not react with the electrolyte used in the electrode assembly. Accordingly, for a conventional lithium ion cell, these elements cannot be fabricated from steel. Typically they are fabricated from aluminum. In contrast, terminal 127 is generally fabricated from steel, thus allowing resistance welding to be used to attach a conductor to the terminal.

Figure 2:
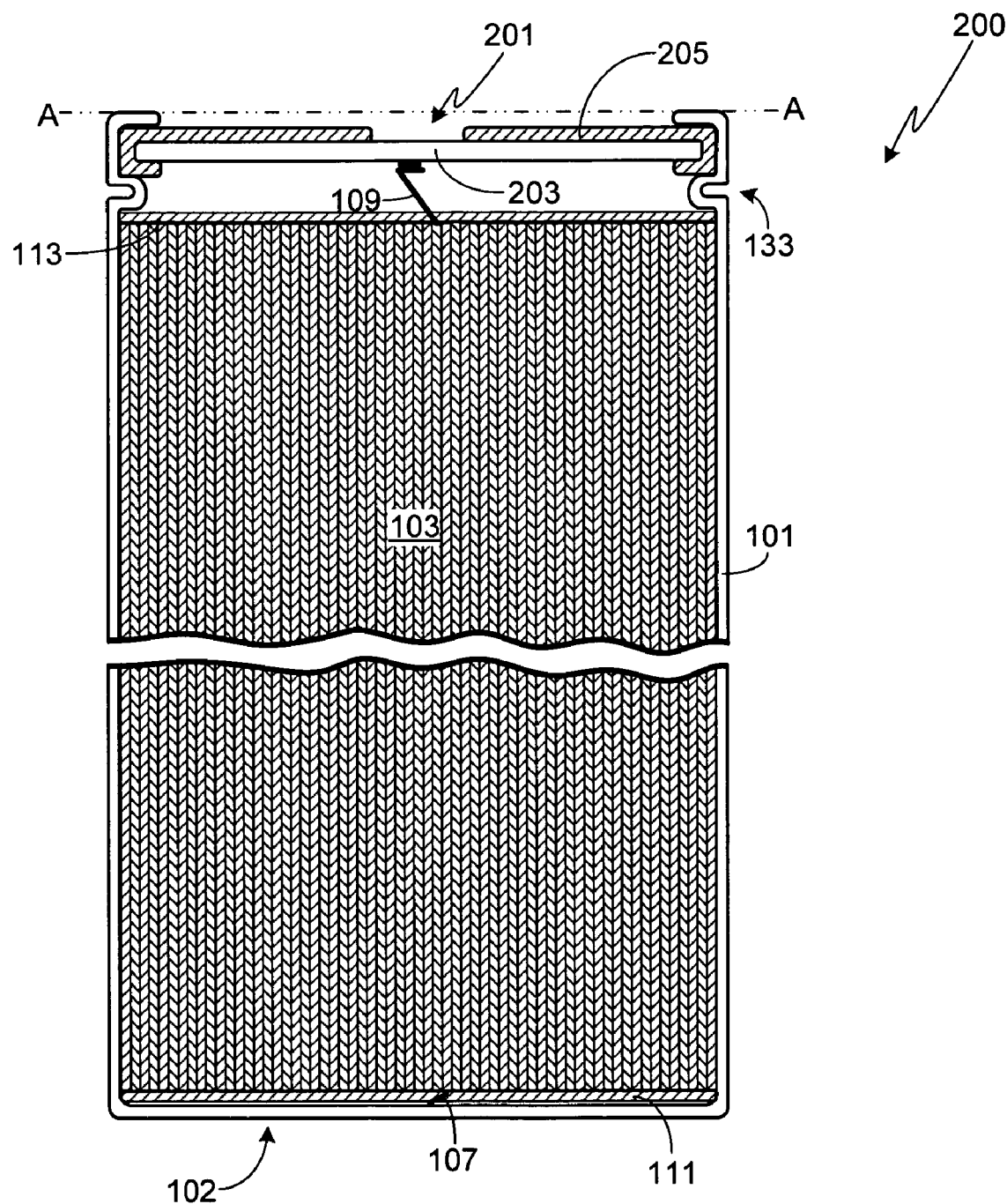
FIG. 2 is a cross-sectional view of a cell and cap assembly in accordance with the invention.

FIG. 2 is a cross-sectional view of a cell 200 in accordance with the invention. As shown, steel terminal cap 127 is eliminated as well as the CID and PTC elements. The inventors have found that for many applications in which a plurality of batteries are coupled together within a battery pack, such safety elements may be included elsewhere within the battery pack, thereby substantially reducing battery complexity, weight and manufacturing cost. Additionally, reducing the complexity of the cap assembly improves the ease by which the seal can be formed between the cap assembly and case 101.

In the illustrated embodiment, electrical connection to the cap assembly is via the central portion 201 of cell terminal 203. As shown, terminal region 201 is defined by insulating gasket 205, gasket 205 extending much further towards the central axis of the battery than in a conventional cell. Preferably gasket 205 covers at least 50 percent of the surface area of the upper surface of element 203, more preferably covers at least 75 percent of the surface area of the upper surface of element 203, still more preferably covers at least 90 percent of the surface area of the upper surface of element 203, and yet still more preferably covers at least 95 percent of the surface area of the upper surface of element 203. Preferably terminal 203, including region 201, is recessed relative to the uppermost plane of cell 200 (i.e., plane A-A) as shown. In the illustrated embodiment, terminal element 203 is planar. Exemplary materials for the fabrication of insulating gasket 205 include synthetic polymers, synthetic fluoropolymers, and polyimides.

If desired, gasket 205 may be comprised of two pieces. For example, in the embodiment illustrated in FIG. 3 gasket 205 is replaced by a first gasket member 301 that covers the upper surface of terminal 203, except for region 201, and a second gasket member 303 that isolates the edge of terminal element 203.

A conventional cell is designed to allow resistance welding to be used to weld a contact/tab to the battery. Since resistance welding is facilitated by metals with poor electrical conductivity, the terminal (e.g., terminal 127) in a conventional cell is typically fabricated from steel. Additionally, since resistance welding creates a localized hot spot where the material melts to form the junction with the contact/tab, terminal 127 is raised relative to the surface of safety vent 123 and preferably includes an air gap 135, thereby preventing damage to the sealed cap assembly. In contrast, terminal element 203 of the present cell is designed for use with ultrasonic welding, not resistance welding. Since ultrasonic welding does not create a localized melt, the terminal does not need to be raised as with the prior assembly. Furthermore, as aluminum works quite well with ultrasonic welding, the same element can be used for both the terminal and the safety vent, thereby decreasing battery weight and manufacturing complexity, and therefore cost.

Figure 3:
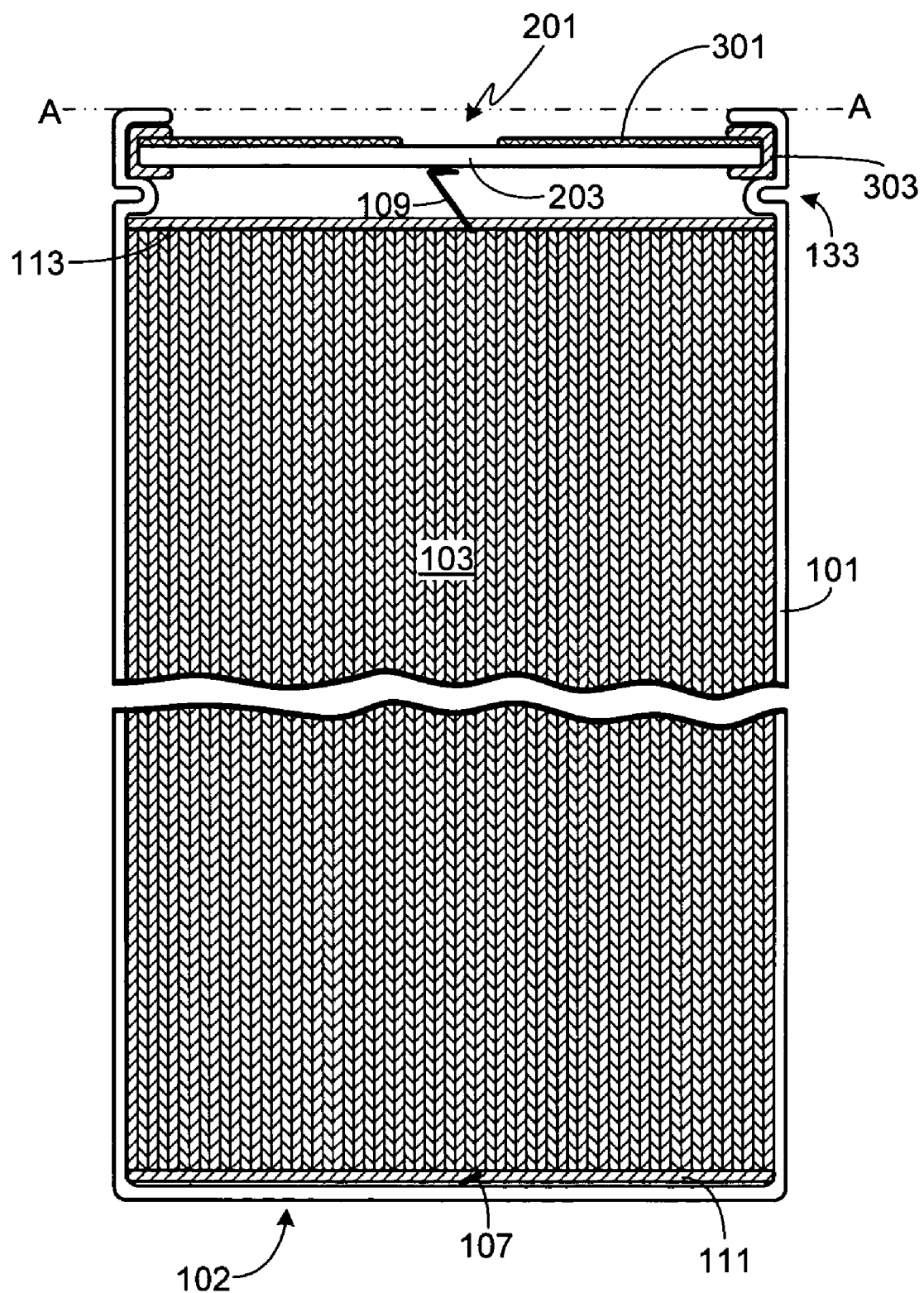
FIG. 3 is a cross-sectional view of a cell and cap assembly in accordance with an alternate embodiment of the invention.

Due to the use of a raised terminal 127, a conventional cell is prone to shorting between the upper edge 137 of case 101 and terminal 127, for example by inadvertently contacting the end of the battery to another battery's case, a metal battery pack component, tooling, or other electrically conductive objects during handling, storage and/or installation. In contrast, the terminal of the presently disclosed cell is recessed as shown in FIGS. 2 and 3, thereby substantially reducing the risk of shorting. The risk of shorting in the present cell is further reduced by expanding the area covered by the insulator, e.g., insulator 205 or insulator 301, as previously described.

The inventors have found that an additional benefit of the present invention is a reduction in condensation and corrosion at the upper edge 139 of case 101.

Figure 4:
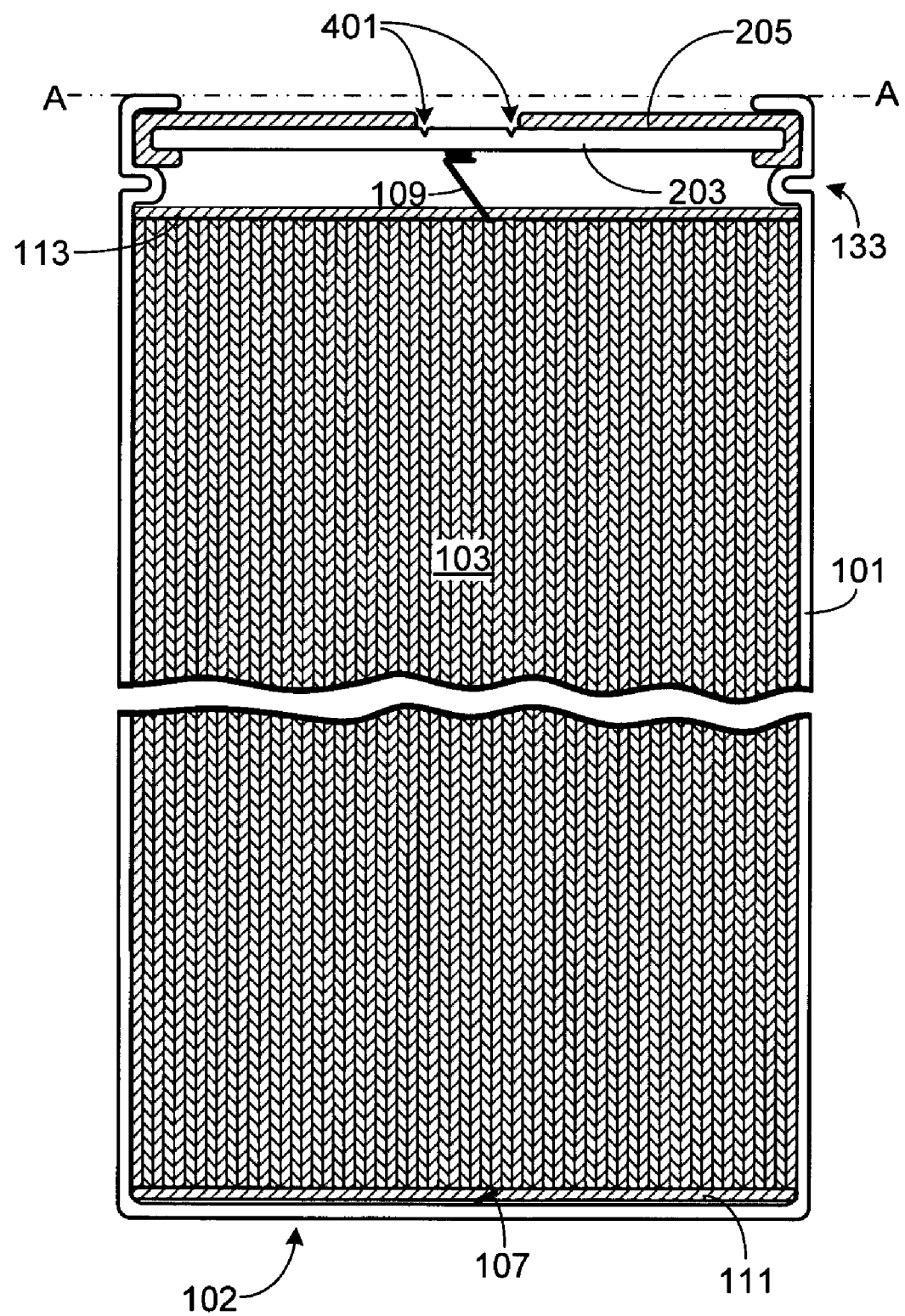
FIG. 4 is a cross-sectional view of the cell shown in FIG. 2 with the inclusion of scoring to facilitate cell venting.
Figure 5:
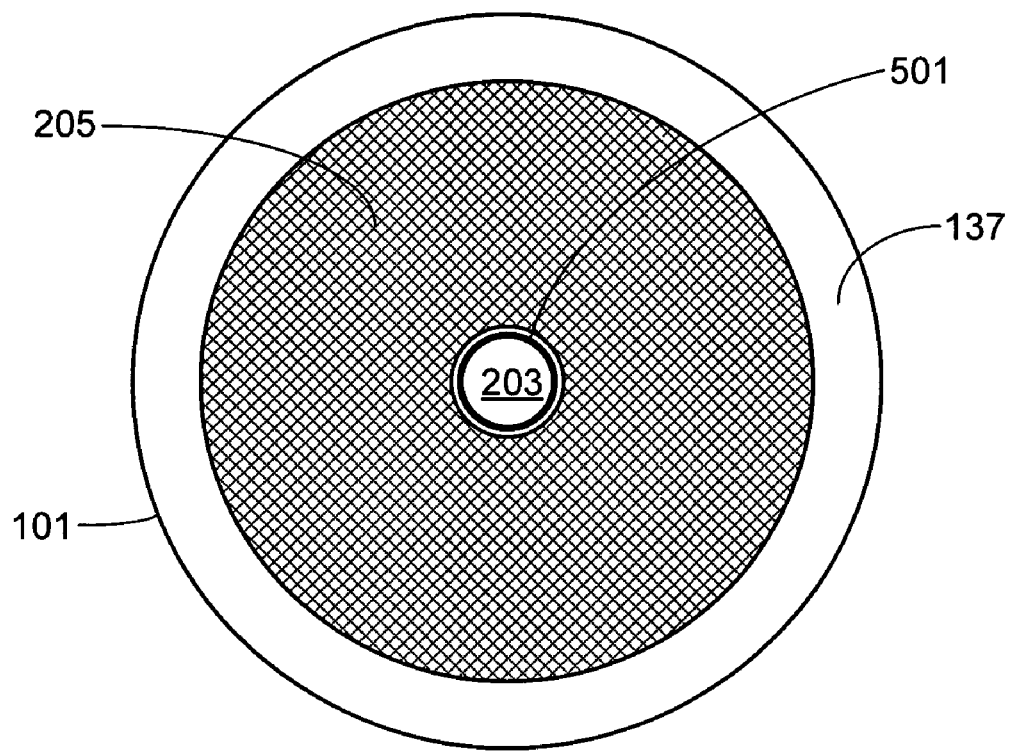
FIG. 5 is a top view of the cell shown in FIG. 4 illustrating a full circular score to facilitate cell venting.
Figure 6:
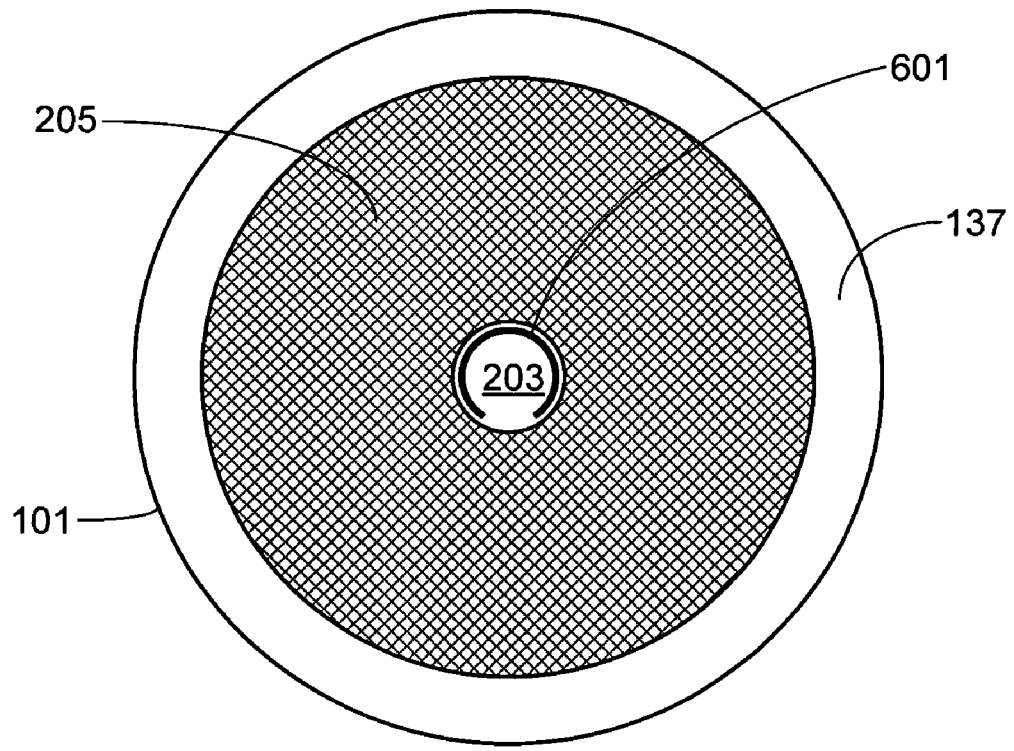
FIG. 6 is a top view of the cell shown in FIG. 4 with the inclusion of an arc score to facilitate cell venting.
Figure 7:
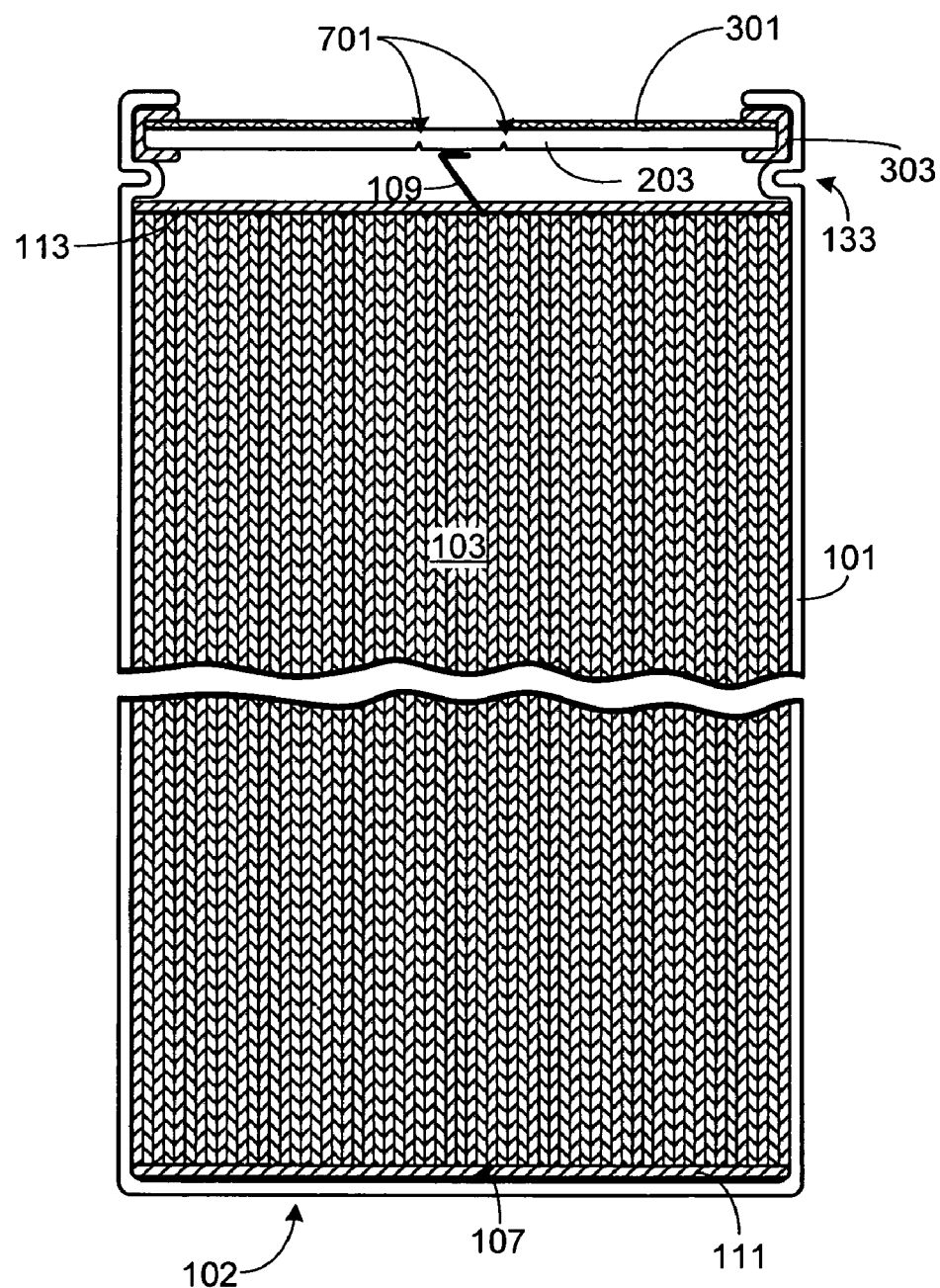
FIG. 7 is a cross-sectional view of the cell shown in FIG. 3 with the inclusion of inner surface scoring of the terminal element to facilitate cell venting.
Figure 8:
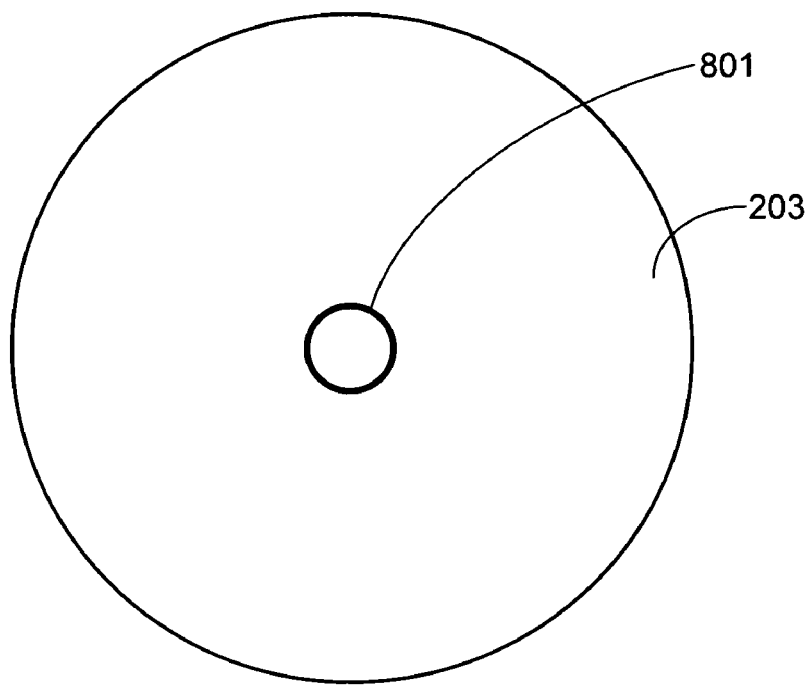
FIG. 8 is a top view of the cell shown in FIG. 7 with a full circular score to facilitate cell venting.
Figure 9:
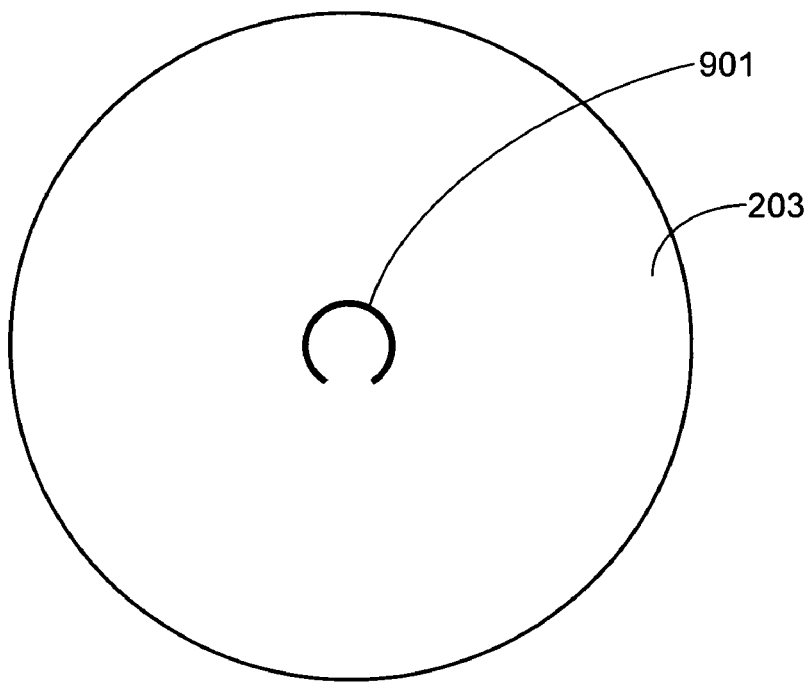
FIG. 9 is a top view of the cell shown in FIG. 7 with an arc score to facilitate cell venting.

In at least one preferred embodiment of the invention, a central region of terminal 203 is scored, thus facilitating the venting of the cell when the internal cell pressure increases beyond the intended operating range of the cell. FIG. 4 illustrates the cell of FIG. 2, modified by the addition of scoring 401. It will be understood that other embodiments of the invention, such as that shown in FIG. 3, can be similarly scored. Scoring 401 can be fabricated using a laser scribe, mechanical scribe, stamping, or other means. FIG. 5 illustrates a top view of a cell such as that of FIG. 4, this view showing a full circular score 501. FIG. 6 illustrates a top view of an alternate design in which scoring 601 is an arc, for example a 300 degree arc, thereby forming a vent hinge. It will be appreciated that the scoring may be on either the outer terminal surface, as shown in FIGS. 4-6, or on the inner terminal surface, as shown in FIGS. 7-9 that illustrate the cell shown in FIG. 3 with scoring 701 (and shown with a full circular score 801 in FIG. 8 and an arc score 901 in FIG. 9).

Although the preferred embodiment of the invention is utilized with a cell using the 18650 form-factor, it will be appreciated that the invention can be used with other cell designs, shapes and configurations.

As will be understood by those familiar with the art, the present invention may be embodied in other specific forms without departing from the spirit or essential characteristics thereof.

What is claimed is:

1. A battery having an 18650 form-factor, wherein said battery does not include a positive temperature coefficient (PTC) current limiting element, and wherein said battery does not include a current interrupt device (CID), the battery comprising:
    a cell case having a cylindrical outer surface, a first end and a second end, wherein said first end is closed by a cell case bottom, and wherein said second end is comprised of a central open portion;
    an electrode assembly contained within said cell case, wherein a first electrode of said electrode assembly is electrically connected to said cell case;
    a terminal element mounted within said cell case and held within said cell case along a peripheral edge of said terminal element, said terminal element closing said central open portion of said second end of said cell case, wherein an inner surface of said terminal element is electrically connected to a second electrode of said electrode assembly, wherein a central region of an outer surface of said terminal element serves as a battery terminal for said battery, and wherein said outer surface of said terminal element is recessed relative to an outermost edge portion of said second end of said cell case; and
    a two-piece gasket assembly, said two-piece gasket assembly comprising:
        a ring-shaped, first gasket member that covers said outer surface of said terminal element except for a central aperture corresponding to said central region of said outer surface, wherein said aperture defines said central region and said battery terminal; and
        a second gasket member that is distinct from said first gasket member and that wraps around said peripheral edge of said terminal element and a peripheral edge of said first gasket member, wherein said second gasket member is interposed between an inner surface of said cell case and said terminal element, and wherein said second gasket member is interposed between said inner surface of said cell case and said first gasket member.

2. The battery of claim 1, wherein said terminal element is comprised of an aluminum material.

3. The battery of claim 1, wherein said first gasket member covers at least 50 percent of said outer surface of said terminal element.

4. The battery of claim 1, wherein said first gasket member covers at least 75 percent of said outer surface of said terminal element.

5. The battery of claim 1, wherein said first gasket member covers at least 90 percent of said outer surface of said terminal element.

6. The battery of claim 1, wherein said first gasket member covers at least 95 percent of said outer surface of said terminal element.

7. The battery of claim 1, wherein said outer surface of said terminal element is substantially planar.

8. The battery of claim 1, wherein said first gasket member is comprised of a material selected from the group of materials consisting of synthetic polymers, synthetic fluoropolymers, and polyimides, and wherein said second gasket member is comprised of a material selected from the group of materials consisting of synthetic polymers, synthetic fluoropolymers, and polyimides.

9. The battery of claim 1, wherein said battery is a lithium ion battery.

10. The battery of claim 1, wherein said outer surface of said terminal element is scored.

11. The battery of claim 10, wherein said scoring on said outer surface of said terminal element forms a full circle.

12. The battery of claim 10, wherein said scoring on said outer surface of said terminal element forms an arc.

13. The battery of claim 1, wherein said inner surface of said terminal element is scored.

14. The battery of claim 13, wherein said scoring on said inner surface of said terminal element forms a full circle.

15. A battery of claim 13, wherein said scoring on said inner surface of said terminal element forms an arc.

* * * * *